US012587750B2

(12) United States Patent
Miyazaki

(10) Patent No.: US 12,587,750 B2
(45) Date of Patent: Mar. 24, 2026

(54) IMAGE PICKUP APPARATUS, CONTROL METHOD, AND STORAGE MEDIUM

(71) Applicant: CANON KABUSHIKI KAISHA, Tokyo (JP)

(72) Inventor: Yasuyoshi Miyazaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 73 days.

(21) Appl. No.: 18/611,369

(22) Filed: Mar. 20, 2024

(65) Prior Publication Data

US 2024/0334068 A1     Oct. 3, 2024

(30) Foreign Application Priority Data

Mar. 27, 2023    (JP) ................................. 2023-050400

(51) Int. Cl.
| | |
|---|---|
| *H04N 23/71* | (2023.01) |
| *G06T 7/11* | (2017.01) |
| *H04N 23/62* | (2023.01) |
| *H04N 23/667* | (2023.01) |

(52) U.S. Cl.
CPC ............. *H04N 23/71* (2023.01); *H04N 23/62* (2023.01); *H04N 23/667* (2023.01); *G06T 7/11* (2017.01)

(58) Field of Classification Search
CPC ........ G06T 7/11; H04N 23/62; H04N 23/667; H04N 23/71; H04N 23/72
See application file for complete search history.

(56) References Cited

U.S. PATENT DOCUMENTS

| | | | | |
|---|---|---|---|---|
| 5,768,540 A | * | 6/1998 | Iwasaki ..................... | G01J 1/42 |
| | | | | 396/234 |
| 2005/0206750 A1 | * | 9/2005 | Aoyagi .................. | H04N 23/71 |
| | | | | 348/238 |
| 2007/0211165 A1 | * | 9/2007 | Yaguchi ................. | H04N 23/71 |
| | | | | 348/E5.04 |
| 2007/0223908 A1 | * | 9/2007 | Sakamoto .............. | H04N 23/71 |
| | | | | 396/234 |
| 2018/0234605 A1 | * | 8/2018 | Hisamoto .............. | H04N 23/71 |
| 2019/0313002 A1 | * | 10/2019 | Wu ......................... | H04N 23/71 |
| 2021/0232827 A1 | * | 7/2021 | Dobashi ................. | G06V 10/60 |

FOREIGN PATENT DOCUMENTS

| | | |
|---|---|---|
| JP | 2006106617 A | 4/2006 |

* cited by examiner

*Primary Examiner* — Amy R Hsu
(74) *Attorney, Agent, or Firm* — Canon U.S.A., Inc. IP Division

(57) ABSTRACT

An apparatus includes a sensor configured to pick up images, a setting device configured to set a photometry mode, and at least one processor and a memory storing instructions that cause the processor to function as a first calculation unit configured to calculate a first value from a whole of a region of an image, a second calculation unit configured to calculate a second value from, out of the region, a region whose value is a predetermined threshold or more, and a determination unit configured to determine a target value, wherein the determination unit uses the first value to determine the target value in a case where a first mode is set by the setting device, and uses the second value to determine the target value in a case where a second mode is set.

18 Claims, 8 Drawing Sheets

TH1 = 100    TH2 = 180  TH3 = 230

TH1 = 100    TH2 = 180   TH3 = 230

IMAGE PICKUP APPARATUS, CONTROL METHOD, AND STORAGE MEDIUM

BACKGROUND

Technical Field

The aspect of the embodiments relates to an image pickup apparatus, a control method, and a storage medium, especially relates to exposure control.

Description of the Related Art

In a case where photometry control is performed in a digital camera, known is a method of calculating an average luminance value of an acquired image, obtaining exposure correction stops to cause this average value to converge into appropriate luminance, and feeding back the exposure correction stops to exposure control such as aperture stop control, shutter control, and International Organization for Standardization (ISO) control to maintain appropriate luminance within a screen.

With use of this method, the average value can be caused to converge into an appropriate luminance level without any issue in a scene with a small difference in luminance within the screen. However, in a case where the above-mentioned exposure calculation is performed in a scene in which there are a high luminance region and a low luminance region within the screen, it is highly likely that exposure shifts in a direction in which gradation is lost toward either a bright portion or a dark portion.

To avoid the above-described situation, Japanese Patent Application Laid-Open No. 2006-106617 discusses a photometry method called highlight photometry. This is a photometry method to perform control to provide gradation in the high luminance region by performing photometry intensively on a high luminance region in the screen.

Because conventional highlight photometry is focused on the high luminance region, there is a case where fine adjustment cannot be performed and brightness in an important region other than the high luminance region drops too low. For example, when a high luminance object enters an angle of view, there is a possibility that exposure becomes underexposure excessively with respect to the other object regions. In such a scene, it is desirable that the luminance of a target, in which a user wants to keep gradation, remain within an appropriate range.

SUMMARY

An aspect of the embodiments provides an apparatus including a sensor configured to pick up images, a setting device configured to set a photometry mode, and at least one processor and a memory coupled to the processor storing instructions that, when executed by the processor cause the processor to function as a first calculation unit configured to calculate a first value from a whole of a region of an image, a second calculation unit configured to calculate a second value from, out of the region, a region whose value is a predetermined threshold or more, and a determination unit configured to determine a target value, wherein the determination unit is configured to use the first value to determine the target value in a case where a first mode is set by the setting device, and use the second value to determine the target value in a case where a second mode set by the setting device.

Further features of the disclosure will become apparent from the following description of exemplary embodiments with reference to the attached drawings.

DESCRIPTION OF THE EMBODIMENTS

Figure 1:
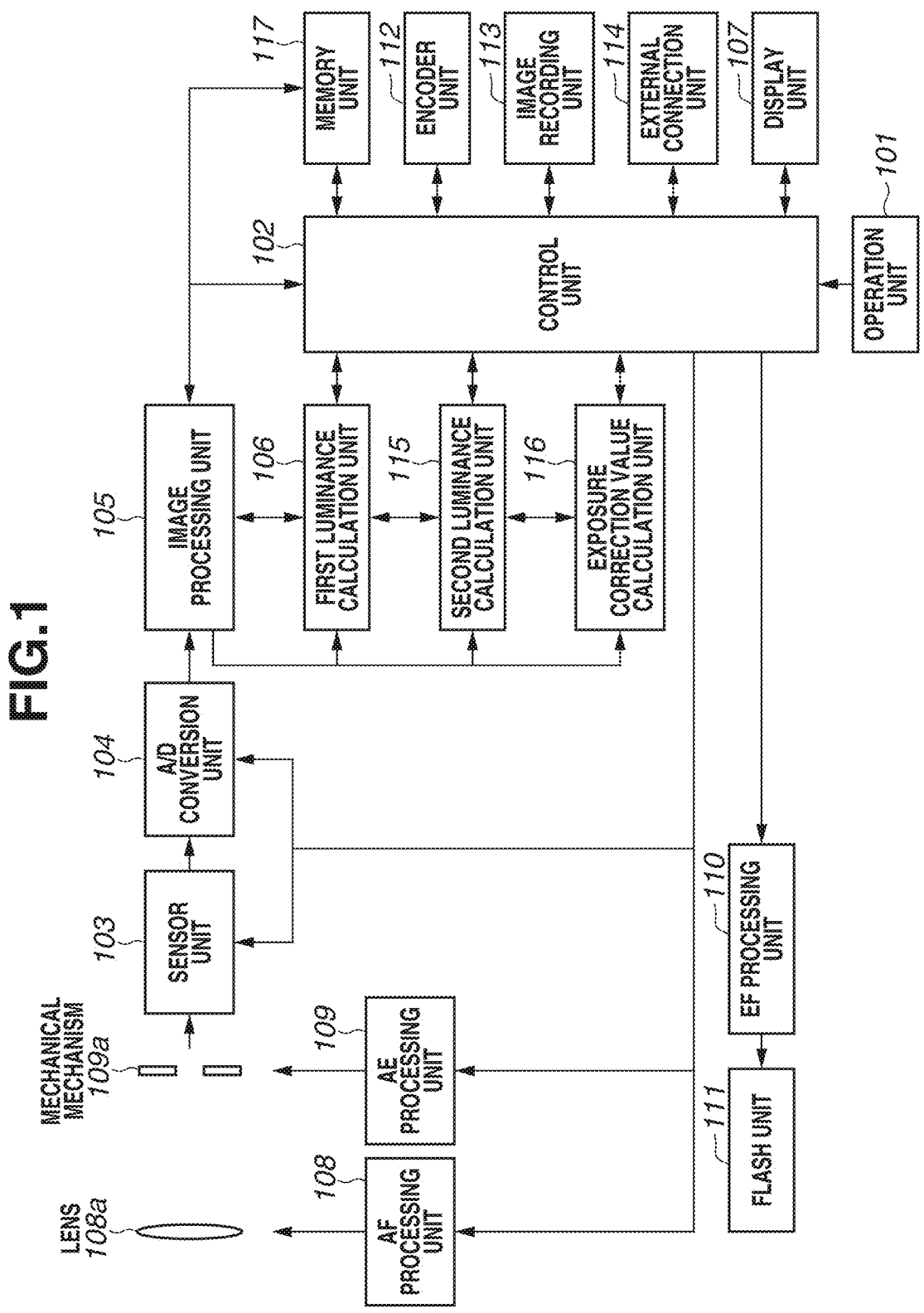
FIG. 1 is a block diagram according to a first exemplary embodiment of the disclosure.

Exemplary embodiments of the disclosure will be described in detail below with reference to the attached drawings. In the figures, the same components are designated by the same reference numerals to avoid redundant description.

A configuration of an image pickup apparatus and the flow of processing according to a first exemplary embodiment of the disclosure are now described with reference to FIG. 1 and the like. A digital camera is to be described as an example of the image pickup apparatus in the present exemplary embodiment, but the image pickup apparatus is not limited to the image pickup apparatus. For example, the disclosure can be applied to any electronic apparatus having an image pickup function such as a smartphone and a tablet.

FIG. 1 is a block diagram illustrating a functional configuration of a digital camera 100 (hereinafter referred to as "camera 100") according to the present exemplary embodiment of the disclosure.

An operation unit 101 is a user interface including switches, buttons, and the like for a user to input various kinds of instructions to the camera 100. The operation unit 101 includes a shutter switch and a touch sensor (which is made operable by a touch on a display device). When detecting operation input to the user interface of various kinds, the operation unit 101 outputs a corresponding control signal to a control unit 102.

The control unit 102 includes a central processing unit (CPU), a non-volatile memory, and a random-access memory (RAM), which are not illustrated. The CPU reads out a program stored in the non-volatile memory, loads the program in the RAM, and executes the program to implement various kinds of functions. For example, the control unit 102 is capable of controlling operations of each unit illustrated in FIG. 1 in response to an instruction from the operation unit 101.

A sensor unit 103 is, for example, an image pickup element such as a charge-coupled device (CCD) and a complementary metal-oxide semiconductor (CMOS) sensor. The sensor unit 103 photoelectrically converts an optical image formed on an image pickup plane via an image pickup optical system including a lens 108a and the like and a mechanical mechanism 109a including a shutter, and outputs charges corresponding to a light amount as an analog image signal. FIG. 1 illustrates only the lens 108*a* as the image pickup optical system for the sake of convenience, but the image pickup optical system may be composed of a plurality of lenses. In the present exemplary embodiment, a description is given of a case where the image pickup optical system, the mechanical mechanism, and the like are integrally arranged in a camera main body including the sensor unit 103. However, a configuration in which an interchangeable lens including the image pickup optical system and the mechanical mechanism is detachably mounted on the camera main body may be adopted.

An analog/digital (A/D) conversion unit 104 applies sampling, gain adjustment, A/D conversion, or the like to the analog image signal output from the sensor unit 103 and outputs a result as a digital image signal.

An image processing unit 105 performs various kinds of image processing on a digital image signal (hereinafter simply referred to as image) output from the A/D conversion unit 104 and outputs a processed image. For example, the image processing unit 105 performs YUV conversion on the image received from the A/D conversion unit 104 and outputs the image. The image to which the image processing is applied by the image processing unit 105 is stored in a memory unit 117, which will be described below.

A first luminance calculation unit 106 uses an image signal stored in the memory unit 117 to calculate an overall luminance evaluation value from the whole image.

A second luminance calculation unit 115 uses an image signal stored in the memory unit 117 to calculate a high luminance evaluation value that is a set threshold or more from a high luminance region. The threshold mentioned herein may be a threshold set by the user via the operation unit 101 or a threshold automatically set within the camera 100.

An exposure correction value calculation unit 116 uses the overall luminance evaluation value and the high luminance evaluation value obtained by the first luminance calculation unit 106 and the second luminance calculation unit 115 to calculate an appropriate exposure correction value.

The display unit 107 is a display device included in the camera 100 composed of a liquid crystal screen and the like. The display unit 107 is capable of displaying an image (digital image signal) output from the A/D conversion unit 104. The display unit 107 performs live view display of the input of the analog image signal output from the sensor unit 103 to function as an electronic viewfinder.

An external monitor, a personal computer, and the like can be connected to an external connection unit 114. For example, by connecting the external monitor to the external connection unit 114, it is possible to display a screen, which is displayed on the display unit 107, also on the external monitor.

An auto-focus (AF) processing unit 108 adjusts the image pickup optical system including the lens 108*a* so as to put a focus on an appropriate object in an imaging setting based on an image stored in the memory unit 117.

An auto-exposure (AE) processing unit 109 calculates a difference from appropriate luminance from the image stored in the memory unit 117, and performs drive control of the mechanical mechanism 109*a* based on an exposure setting.

An electronic flash (EF) processing unit 110 causes a flash unit 111 to emit light in a light amount that enables appropriate brightness of an object in a case where the control unit 102 makes determination about light emission.

An encoder unit 112 converts a format of the output image into a format such as a Joint Photographic Experts Group (JPEG) format, and outputs the image to an image recording unit 113.

The image recording unit 113 performs processing of recording the image, which has been subjected to the format conversion and output from the encoder unit 112, in a memory (not illustrated) in the image pickup apparatus, a memory card inserted into the camera 100, a detachable recording medium (not illustrated), or the like.

The memory unit 117 temporarily stores image data being processed by the control unit 102, the image processing unit 105, the encoder unit 112, or the like. Each of the image processing unit 105, the first luminance calculation unit 106, the second luminance calculation unit 115, and the exposure correction value calculation unit 116 may be implemented by execution of software by a processor, or may be implemented by dedicated hardware. The image processing unit 105, the first luminance calculation unit 106, the second luminance calculation unit 115, and the exposure correction value calculation unit 116 have been described as different components of the control unit 102, but the configuration is not limited to the above-described example. At least part of functions of the image processing unit 105, the first luminance calculation unit 106, the second luminance calculation unit 115, and the exposure correction value calculation unit 116 may be included in the control unit 102. In this case, the functions included in the control unit 102 are implemented by, for example, execution of a program stored in the non-volatile memory by the CPU.

A description will be given of an outline of normal operations in a case where imaging is performed with use of the camera 100 according to the present exemplary embodiment.

In response to detection by the operation unit 101 that a power button of the camera 100 has been turned on by a user, the control unit 102 detects a content of an operation based on a corresponding control signal, and performs control to supply power to each unit included in the camera 100. When power is supplied to each unit included in the camera 100, the shutter is opened by the mechanical mechanism 109*a*, and the sensor unit 103 starts an image pickup operation and subsequently outputs log signals. Predetermined processing is applied to the output analog image signal by the A/D conversion unit 104 and the image processing unit 105, and thereafter a result is stored in the memory unit 117.

Figure 3A:
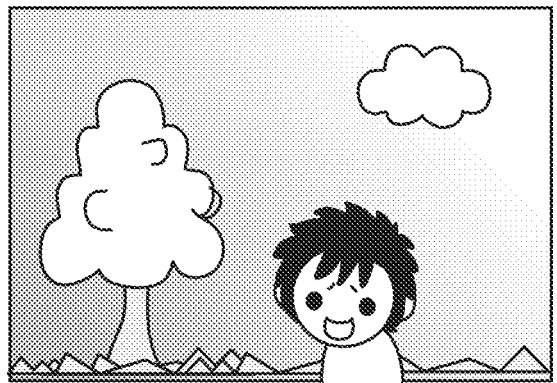
FIGS. 3A to 3D are views each illustrating an issue of the present disclosure.
Figure 3B:
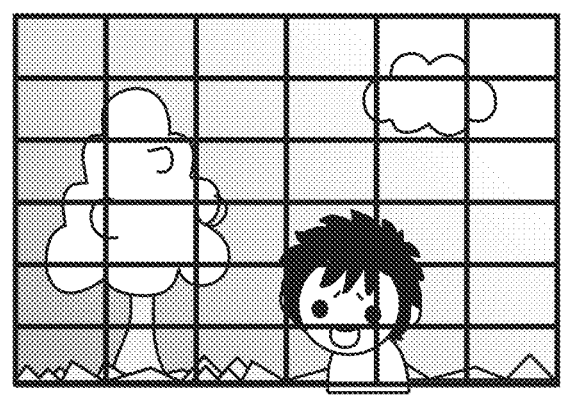
Figure 3C:
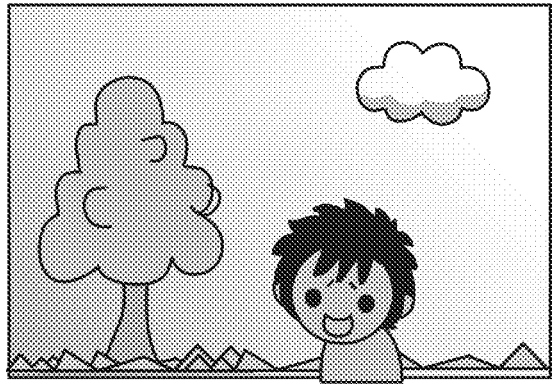
Figure 3D:
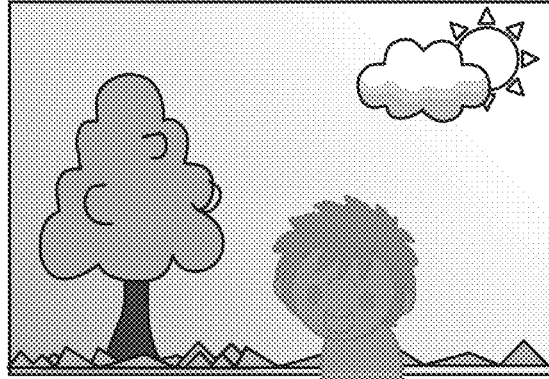

The first luminance calculation unit 106 calculates the overall luminance evaluation value from luminance of the whole screen of the image data stored in the memory unit 117. In the present disclosure, the description is given assuming that the overall luminance evaluation value is calculated with respect to FIG. 3A. The first luminance calculation unit 106 divides the whole screen of the image corresponding to FIG. 3A into block integrals in a grid-like pattern as illustrated in FIG. 3B, and obtains average luminance by assigning a weight for each region to a luminance value obtained from each block.

Figure 4:
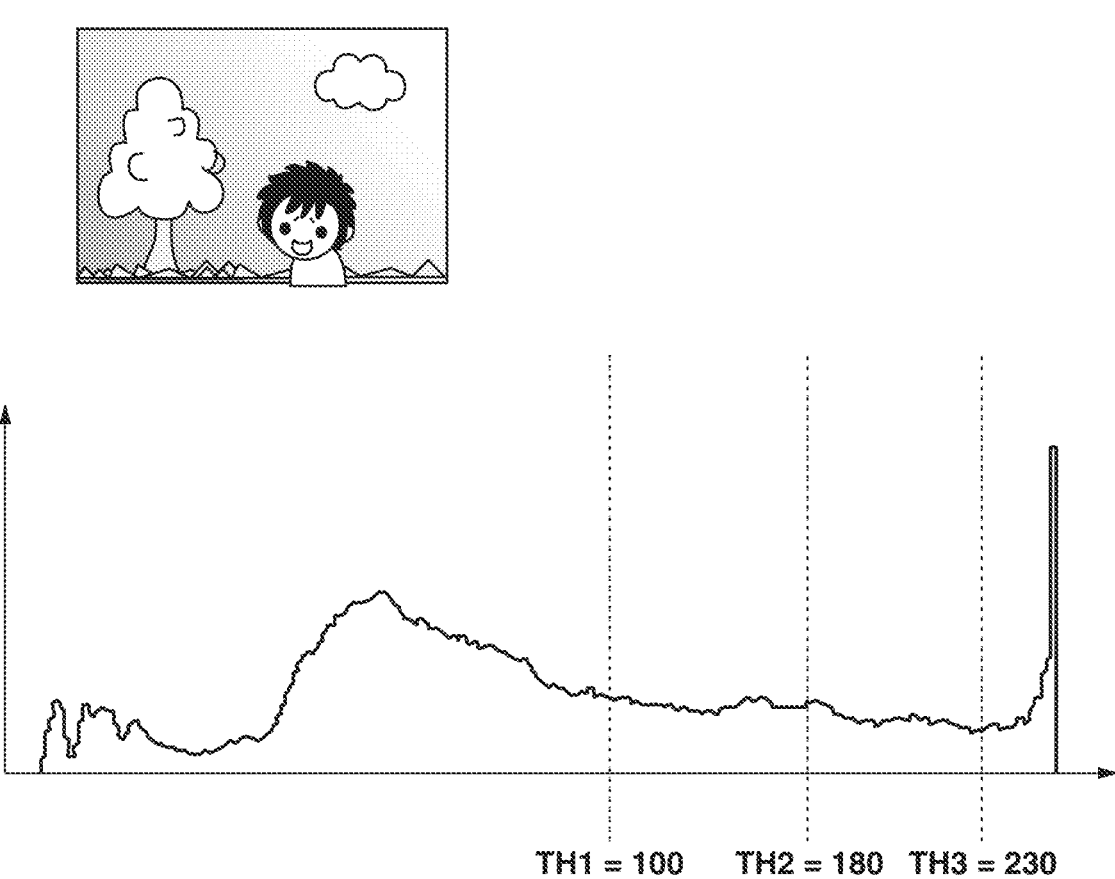
FIG. 4 is a chart illustrating a plurality of highlight threshold settings in the present disclosure.

The second luminance calculation unit 115 calculates a high luminance evaluation value. Here, the second luminance calculation unit 115 acquires a histogram obtained by accumulating the block integrals within the image, performs calculation (accumulation) from the high luminance side to obtain a luminance value in a predetermined ratio, and calculates an evaluation value from a difference from a set threshold. The description is given assuming that the threshold mentioned herein is a setting value selectable by a user and a threshold setting on a luminance histogram illustrated in FIG. 4 is used. A graph in FIG. 4 is a histogram in which an abscissa axis indicates luminance gradation, and an ordinate axis indicates accumulated values. In the present disclosure, three patterns of threshold settings are assumed. TH1 (threshold 1) represents a luminance value of Y100 in an eight-bit image, indicating the vicinity of target luminance. TH3 (threshold 3) represents a luminance value of Y230 assuming that maximum luminance gradation within the screen can be used. TH2 (threshold 2) represents a luminance value of Y180 assuming intermediate luminance between TH1 and TH3. The patterns of the thresholds that can be set by the user are not limited to this example.

The exposure correction value calculation unit 116 calculates exposure stops. An operation in the exposure correction value calculation unit 116 is different depending on a preliminarily set photometry method (mode). In the present disclosure, a method of performing photometry averagely within an angle of view is defined as evaluation photometry, and a method of superimposing correction in consideration of a highlight is defined as highlight photometry. In a case where the evaluation photometry is selected, the exposure correction value calculation unit 116 obtains a difference between overall average luminance obtained by the first luminance calculation unit 106 and exposure appropriate target luminance, and calculates exposure stops to correct the difference. In a case where the highlight photometry is selected, the exposure correction value calculation unit 116 uses a ratio of high luminance calculated by the second luminance calculation unit 115 to calculate a correction value that causes the ratio to converge into a desired ratio, and adds the correction value to the above-mentioned exposure stops to obtain correction stops at the time of the highlight photometry. Details thereof will be described below. The present exemplary embodiment of the present disclosure is described on the assumption of a case of calculating the ratio of the high luminance portion in a particle size of the block integral, but a case of calculating the above-mentioned ratio in a pixel unit is also within the scope of the assumption of the present disclosure.

The obtained image is fed back to the AE processing unit 109 using information about an object region and a distance measurement point region via the control unit 102, and the AE processing unit 109 performs convergence control to obtain correct exposure.

When receiving a notification about a signal referred to as a first shutter switch signal SW1 from a shutter switch, the control unit 102 uses image information at this point of time to perform AF processing and AE processing, and acquires an optimum focus for imaging and an exposure setting condition. The first shutter switch signal SW1 mentioned herein is a signal generated during an operation of the shutter switch, or so-called half pressing (an instruction for imaging preparation). A signal referred to as a second shutter switch signal SW2 is generated by completion of the operation of the shutter switch, or so-called full pressing (an instruction for imaging).

In a case where the second shutter switch signal SW2 is received by the control unit 102 and a transition is made to main imaging, the sensor unit 103 performs an operation of imaging processing to read out charges generated by incident light via a lens and an exposure mechanism and output the charges as an analog image signal to the A/D conversion unit 104. In a case where the control unit 102 detects a current luminance value from the image output from the image processing unit 105 and determines that the current luminance value is less than a predetermined threshold, the EF processing unit 110 makes determination about light emission, whereby the flash unit 111 can perform main light emission processing. Whether the flash unit 111 executes the main light emission processing can be preliminarily set via the operation unit 101 or the like.

The A/D conversion unit 104 performs sampling, gain adjustment, A/D conversion, or the like on the analog image signal output from the sensor unit 103 and outputs a result as a digital image signal. The image processing unit 105 performs various kinds of image processing on the digital image signal, and outputs the processed digital image signal.

The encoder unit 112 converts a format of the digital signal output from the image processing unit 105 into a format such as the JPEG format, and outputs the digital signal to the image recording unit 113. The image recording unit 113 performs processing of recording the image data subjected to the format conversion in a predetermined memory. By connecting the external connection unit 114 to the external monitor, it is possible to reproduce an image, which is displayed on the display unit 107, also on the external monitor.

Figure 2:
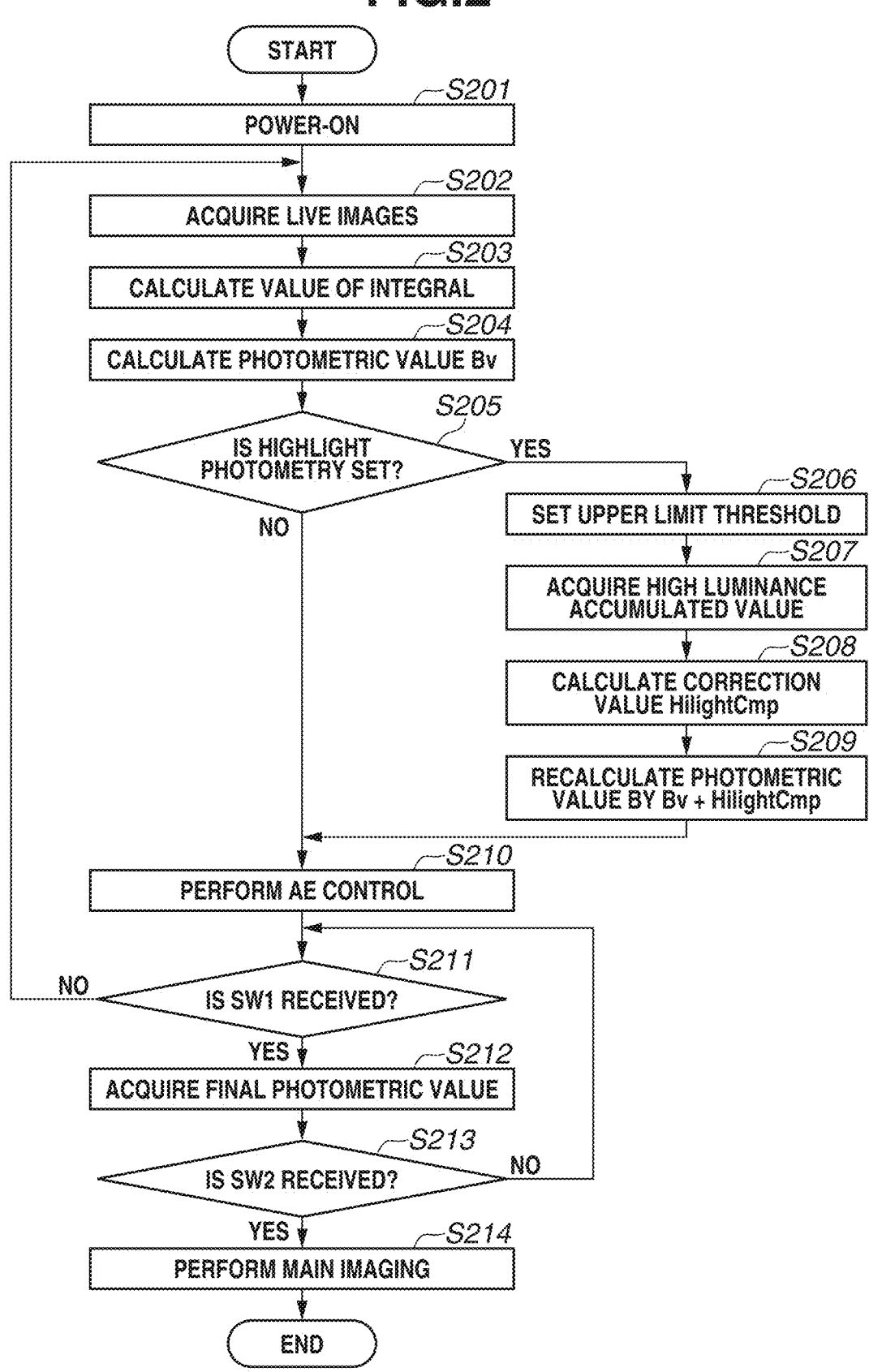
FIG. 2 illustrates the flow of highlight photometry processing.

The flow of processing regarding highlight photometry is now described with reference to FIG. 2. The flow is executed by the control unit 102 reading out a program stored in the non-volatile memory, loading the program in the RAM, and executing the program to control each unit of the camera 100.

In step S201, first, the user powers on the camera 100. In step S201, in response to the power-on of the camera 100, the control unit 102 controls each unit of the camera 100 to start preparation imaging. The control unit 102 maintains a predetermined frame rate, and the camera 100 sequentially picks up images, and displays the acquired captured images on the display unit 107.

In step S202, the first luminance calculation unit 106 sequentially acquires images (live images) obtained by picking up images in step S201.

In step S203, the first luminance calculation unit 106 divides each image acquired in step S202 into blocks in a grid-like pattern, and acquires a value of integral of luminance of each block. The processing then proceeds to step S204.

The method of acquiring the value of integral is not limited to the above example.

In step S204, the first luminance calculation unit 106 acquires a photometric value of the acquired image based on the value of integral acquired in step S203. The photometric value is obtained by calculation of an average luminance value by assigning a weight for each region to a luminance value acquired in each block as illustrated in FIG. 3B. A difference between the average luminance value and exposure target luminance is set as $\Delta Bv$, and $\Delta Bv$ is added to a photometric value Bv currently under control, whereby a next target Bv is calculated. That is, assuming that the photometric value currently under control is Bv1 and the next target photometric value is Bv2, a relationship of Bv2=Bv1+$\Delta Bv$ holds.

In step S205, the control unit 102 determines whether a type of a photometry mode set in the camera 100 is highlight photometry. In the present disclosure, assumed is a configuration in which two types of evaluation photometry and highlight photometry are selectable as the types of photometry modes in a user interface (UI) menu. When the highlight photometry is not selected (NO in step S205), the evaluation photometry is selected. In this case, the processing proceeds to step S210. In step S210, the AE processing unit 109 performs exposure control (AE control) based on the above-mentioned target Bv value.

In a case where the control unit 102 determines that the type is the highlight photometry (YES in step S205), the processing proceeds to step S206. In step S206, the control unit 102 sets an upper limit threshold of a luminance histogram. The upper limit threshold of the luminance histogram mentioned therein may be set by the user via the operation unit 101. For example, selectable thresholds as illustrated in FIG. 4 may be preliminarily set by the user. Such a specification enables different use depending on the user's purposes. For example, for a user who wants to use the luminance gradation within the screen as effectively as possible, it becomes possible to select a threshold for high luminance as TH3, and thereby select a setting that takes into consideration of the loss of the dark portion while preventing overexposure. For a user who considers the high luminance region to be a main object, it becomes possible to make a setting to decrease a threshold to the exposure target luminance (target luminance value) as TH1. That is, the threshold can be set at the target luminance value or more. For a user who considers prioritizing the high luminance gradation without decreasing the threshold to TH1 and considers performing digital processing using a personal computer (PC) application after imaging to make gradation correction on the dark portion and the bright portion, it becomes possible to make a setting with a margin on the high luminance gradation side as TH2.

In step S207, the second luminance calculation unit 115 acquires a high luminance accumulated value based on the upper limit value of the luminance histogram set in step S206. In step S208, the exposure correction value calculation unit 116 uses the high luminance accumulated value acquired in step S207 to calculate a correction value.

Regarding details of steps S207 and S208, the following flow is assumed in the present disclosure.

Figure 7:
FIG. 7 is a histogram in the flow of the processing illustrated in FIG. 2.
Figure 7:
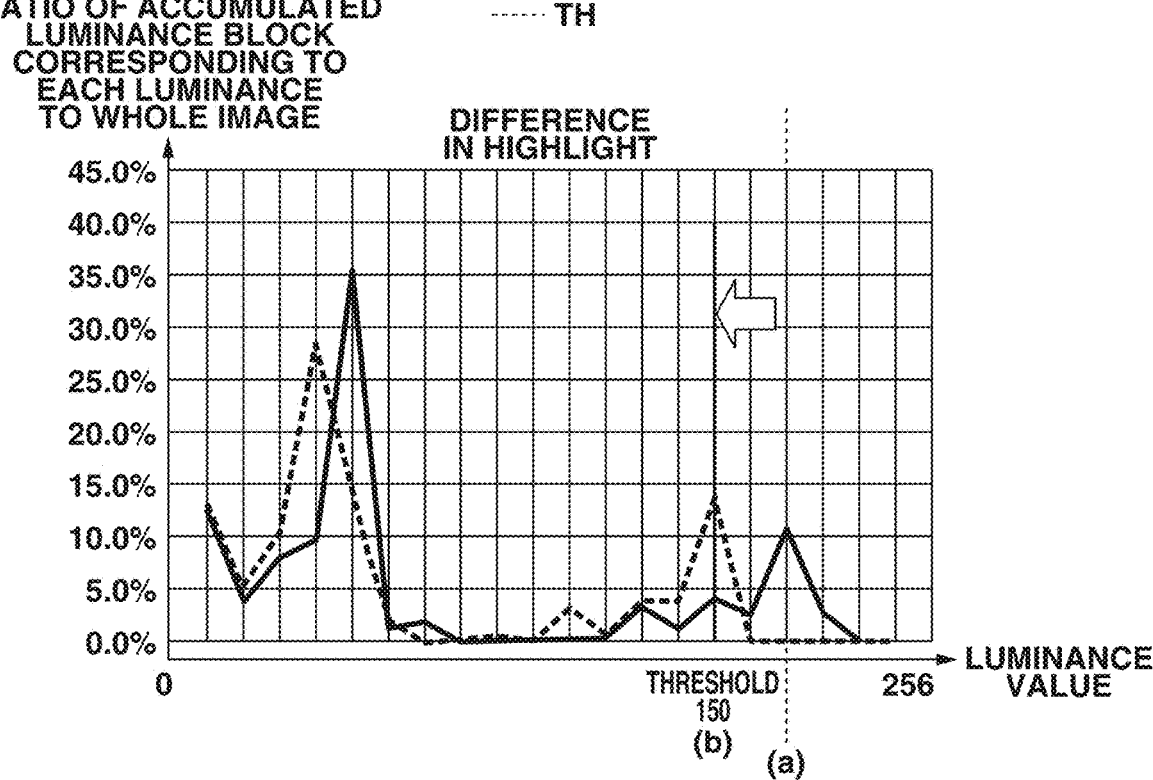

In step S207, the second luminance calculation unit 115 accumulates a block integral value in the image for each luminance with an exposure control value at the present time to obtain the luminance histogram (FIG. 7). The second luminance calculation unit 115 acquires a luminance value that ranks in the top 3% of the histogram (corresponding to luminance (a) at a position indicated by a dotted line in FIG. 7), that is, a high luminance accumulated value.

In step S208, the exposure correction value calculation unit 116 calculates a difference in luminance stops between the luminance (a) in FIG. 7 and the threshold luminance set in step S206 (a luminance value corresponding to luminance (b) in FIG. 7, Y150 in this example) based on the following Expression.

$$HilightCmp = LOG2(a/b) \qquad (1)$$

The obtained difference in luminance stops can serve as correction stops (correction value) with respect to the current photometric value. That is, assuming that the photometric value currently under control is Bv1 and the next target photometric value is Bv2, a relationship of Bv2=Bv1+HilightCmp can hold.

In step S209, the second luminance calculation unit 115 adds the correction stops obtained by the exposure correction value calculation unit 116 in step S208 to the current photometric value to calculate a new photometric value.

In step S210, the control unit 102 feeds back the photometric value newly obtained in step S209 to AE control, whereby exposure control is executed.

In step S211, the control unit 102 determines whether it has received a notification about the first shutter switch signal SW1 from the shutter switch. In a case where the notification about the first shutter switch signal SW1 is not issued (NO in step S211), the above-mentioned processing from step S202 to step S210 is repeated. In contrast, when the notification about the first shutter switch signal SW1 is issued (YES in step S211), the processing proceeds to step S212. In step S212, the control unit 102 acquires a final photometric value.

In step S213, the control unit 102 determines whether it has received a notification about the second shutter switch signal SW2 from the shutter switch to determine whether to perform main imaging based on the final photometric value. In a case where the notification about the second shutter switch signal SW2 is issued (YES in step S213), the processing proceeds to step S214. In step S214, the main imaging is performed and the imaging ends. In a case where the notification about the second shutter switch signal SW2 is not issued (NO in step S213), the processing returns to step S211, in which the control unit 102 determines whether it has received the notification about the first shutter switch signal SW1. In a case where the notification about the first shutter switch signal SW1 is not issued (NO in step S211), the processing returns to step S202. In a case where the notification about the first shutter switch signal SW1 is issued (YES in step S211), the processing proceeds to step S212. In step S212, the control unit 102 newly acquires a final photometric value, and prepares for the notification about the second shutter switch signal SW2.

As described above, the configuration enables control of the high luminance region to have gradation as intended by the user when the highlight photometry is selected, and thereby enables an appropriate exposure setting as the whole image without correcting a region other than the high luminance region to be an underexposure state.

Figure 5:
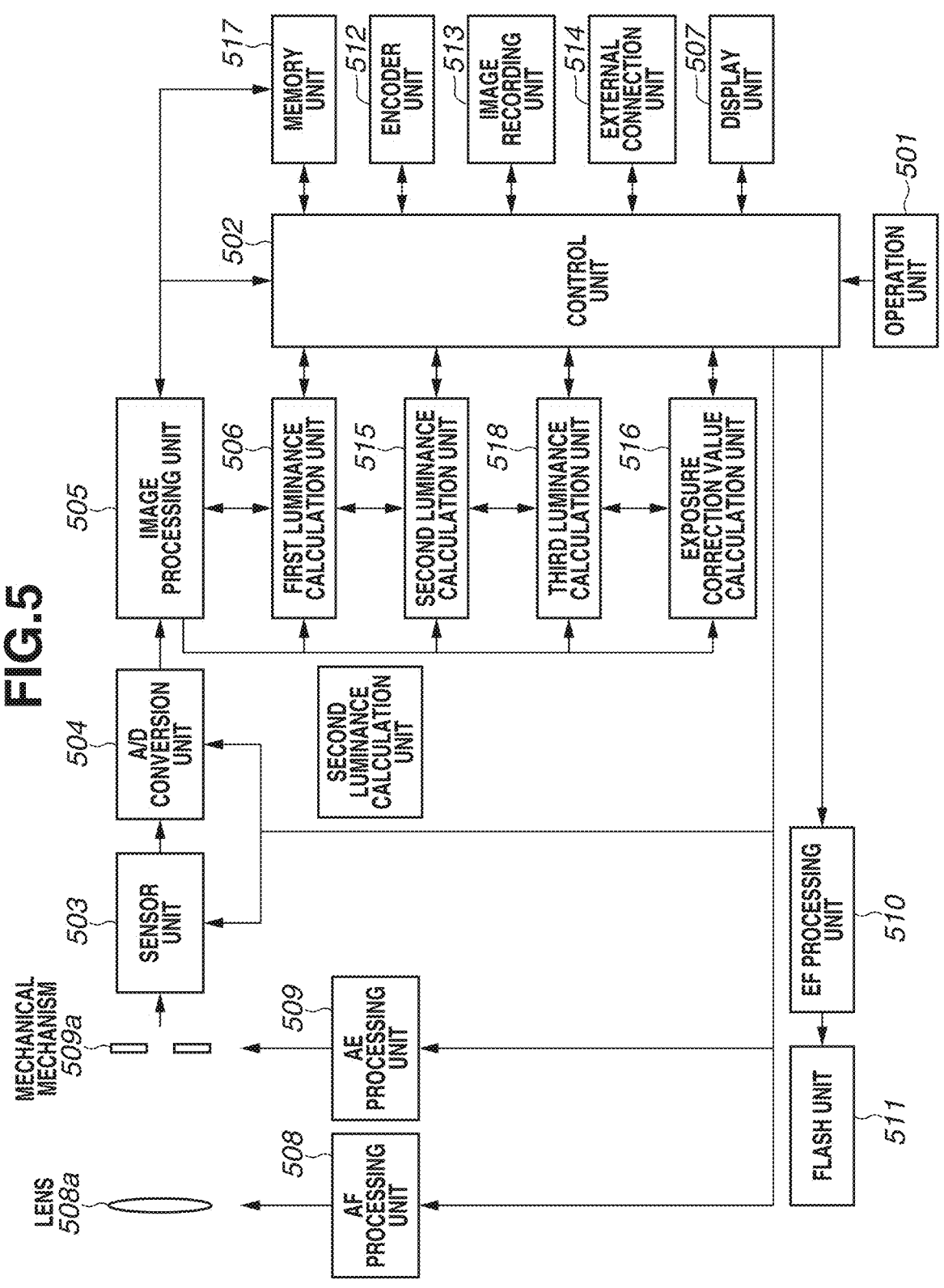
FIG. 5 is a block diagram according to a second exemplary embodiment of the present disclosure.

A configuration of an image pickup apparatus and the flow of processing according to a second exemplary embodiment are now described with reference to FIG. 5 and the like. FIG. 5 is a block diagram illustrating a configuration example of the image pickup apparatus according to the second exemplary embodiment. A digital camera 500 (hereinafter referred to as camera 500) is to be described as an example of the image pickup apparatus in the present exemplary embodiment, but the image pickup apparatus is not limited to the digital camera. For example, the disclosure can be applied to any electronic apparatus having an image pickup function such as a smartphone and a tablet.

Parts overlapping those in the first exemplary embodiment are omitted. Features of the second exemplary embodiment are a third luminance calculation unit 518 and an exposure correction value calculation unit 516. The second exemplary embodiment may have a configuration that enables processing similar to that in the first exemplary embodiment. That is, this can be implemented by a configuration in which a modification to add the third luminance calculation unit 518 and the exposure correction value calculation unit 516 is made to the configuration in the first exemplary embodiment illustrated in FIG. 1.

The third luminance calculation unit 518 uses an image signal obtained from an image processing unit 505 to calculate a low luminance evaluation value that is a set threshold or less from a low luminance region.

The exposure correction value calculation unit 516 uses an overall luminance evaluation value, a high luminance evaluation value, the low luminance value obtained by a first luminance calculation unit 506, a second luminance calculation unit 515, the third luminance calculation unit 518, respectively, to calculate an appropriate exposure correction value.

The flow of the imaging operation using the image pickup apparatus according to the disclosure is now described.

Parts overlapping those in the first exemplary embodiment are omitted, and only the flow of processing in the first luminance calculation unit 506, the second luminance calculation unit 515, and the third luminance calculation unit 518 is to be described.

The first luminance calculation unit 506 calculates the overall luminance evaluation value from luminance of the whole screen of the image data output from the image processing unit 505. In the present disclosure, the first luminance calculation unit 506 obtains the overall luminance evaluation value by dividing the whole screen into block integrals in a grid-like pattern as illustrated in FIG. 3B and obtaining average luminance by assigning a weight for each region to a luminance value obtained from each block.

The second luminance calculation unit 515 calculates the high luminance evaluation value. At this time, the second luminance calculation unit 515 acquires a histogram obtained by accumulating the block integrals within the image, performs calculation (accumulation) from the high luminance side to obtain a luminance value in a predetermined ratio, and calculates an evaluation value from a difference from a set threshold.

The threshold mentioned herein is a setting value selectable by the user (FIG. 4). In the present disclosure, three patterns of threshold settings are assumed. For example, TH1 is 100, TH2 is 150, and TH3 is 230 in an eight-bit image. TH1 is assumed to be luminance corresponding to appropriate exposure luminance, TH3 is on the assumption that maximum luminance gradation within the screen can be used, and TH2 is assumed to be intermediate luminance between TH1 and TH3.

The third luminance calculation unit 518 calculates the low luminance evaluation value. At this time, the third luminance calculation unit 518 acquires the histogram obtained by accumulating the block integrals within the image, performs calculation (accumulation) from the low luminance side to obtain the luminance value in the predetermined ratio (luminance (c) in FIG. 8), and calculates an evaluation value from a difference from the set threshold.

An operation in the exposure correction value calculation unit 516 is different depending on a photometry method preliminarily set in an operation unit 501. In the present disclosure, a method of performing photometry averagely within an angle of view is defined as evaluation photometry, and a method of superimposing correction in consideration of a highlight is defined as highlight photometry. In a case where the evaluation photometry is selected, the exposure correction value calculation unit 516 obtains a difference between the overall average luminance obtained by the first luminance calculation unit 506 and exposure appropriate target luminance, and calculates exposure stops to correct the difference. In a case where the highlight photometry is selected, the exposure correction value calculation unit 516 uses a ratio of high luminance calculated by the second luminance calculation unit 515 to calculate a correction value that causes the ratio to converge into a desired ratio, and adds the correction value to the above-mentioned exposure stops to obtain correction stops at the time of the highlight photometry. The exposure correction value calculation unit 516 uses the low luminance evaluation value calculated by the third luminance calculation unit 518 to put a restriction on the correction to prevent the image from being in an excessive underexposure state when subjected to correction with the obtained corrected stops.

The present exemplary embodiment of the present disclosure is described on the assumption of a case of calculating the ratio of the high luminance portion in a particle size of the block integral, but a case of calculating the above-mentioned ratio in a pixel unit is also within the scope of the assumption of the present disclosure.

The flow of processing regarding the above-mentioned highlight photometry is now described.

Figure 6:
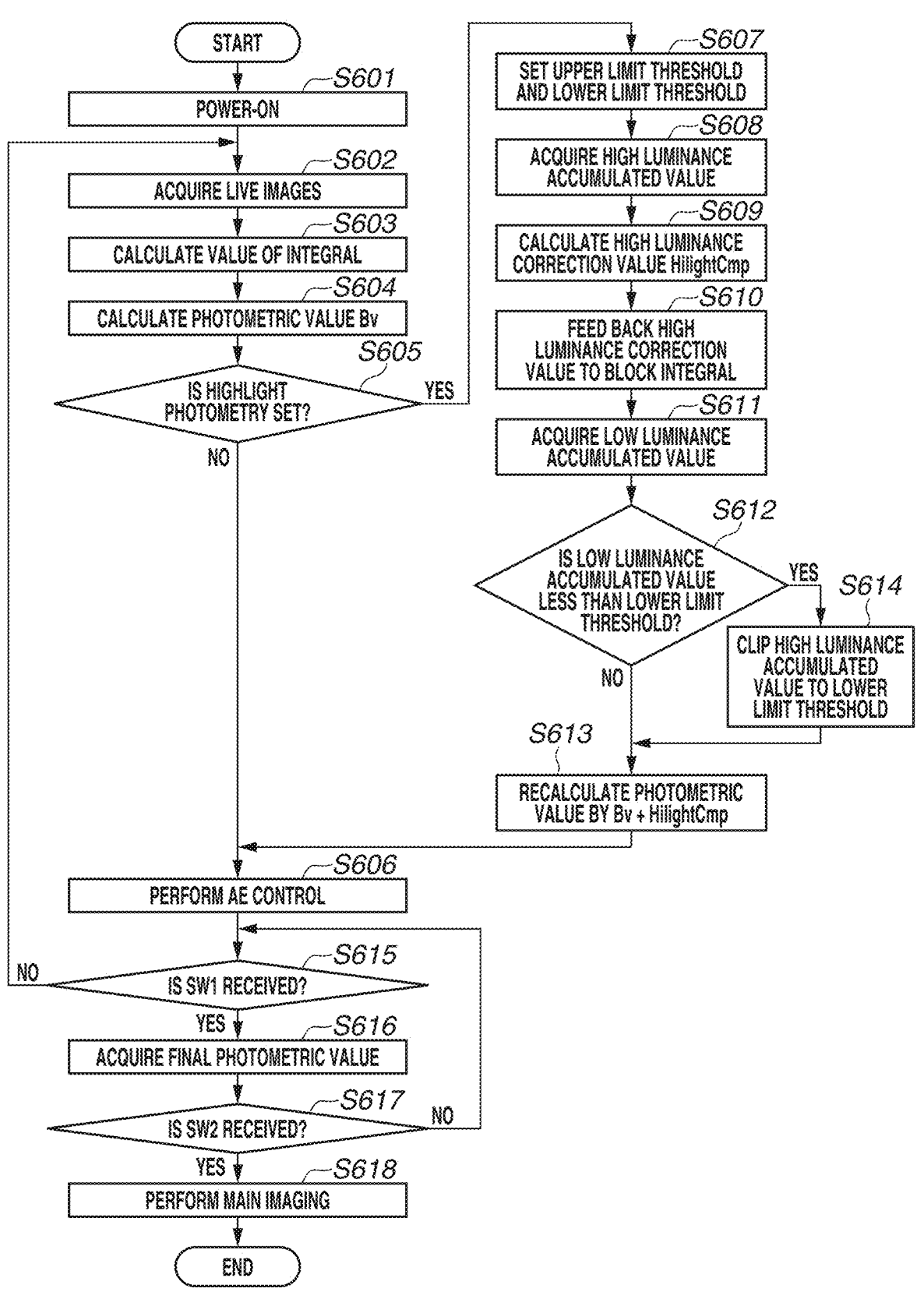
FIG. 6 illustrates the flow of highlight photometry processing including a low luminance threshold.

FIG. 6 is a detailed flowchart describing the above-mentioned control. The flow is executed by a control unit 502 reading out a program stored in a non-volatile memory, loading the program in a RAM, and executing the program to control each unit of the camera 500.

In step S601, first, the user powers on the camera 500. In step S601, in response to the power-on of the camera 500, the control unit 502 controls each unit of the camera 500 to start preparation imaging. The control unit 502 maintains a predetermined frame rate, and the camera 500 sequentially picks up images, and displays the acquired captured images on a display unit 507.

In step S602, the first luminance calculation unit 506 sequentially acquires images (live images) obtained by picking up images in step S601.

In step S603, the first luminance calculation unit 506 divides the image acquired in step S602 into blocks in a grid-like pattern, and acquires a value of integral of luminance of each block. The processing then proceeds to step S604.

The method of acquiring the value of integral is not limited to the above example.

In step S604, the first luminance calculation unit 506 acquires a photometric value based on the value of integral acquired in step S603. The first luminance calculation unit 506 acquires the average luminance obtained by assigning a weight for each region to a luminance value obtained for each block as illustrated in FIG. 3B, and, assuming that a difference between the average luminance value and an exposure target luminance is ΔBv, and adds ΔBv to a photometric value Bv currently under control to calculate a next target Bv.

In step S605, the control unit 502 determines whether a type of a photometry mode set in the camera 500 is the highlight photometry. In the present disclosure, assumed is a configuration in which two types of the evaluation photometry and the highlight photometry are selectable as the types of photometry modes in a UI menu. When the highlight photometry is not selected (NO in step S605), the evaluation photometry is selected. In this case, the processing proceeds to step S606. In step S606, an AE processing unit 509 performs exposure control (AE control) based on the above-mentioned target Bv value.

Figure 8:
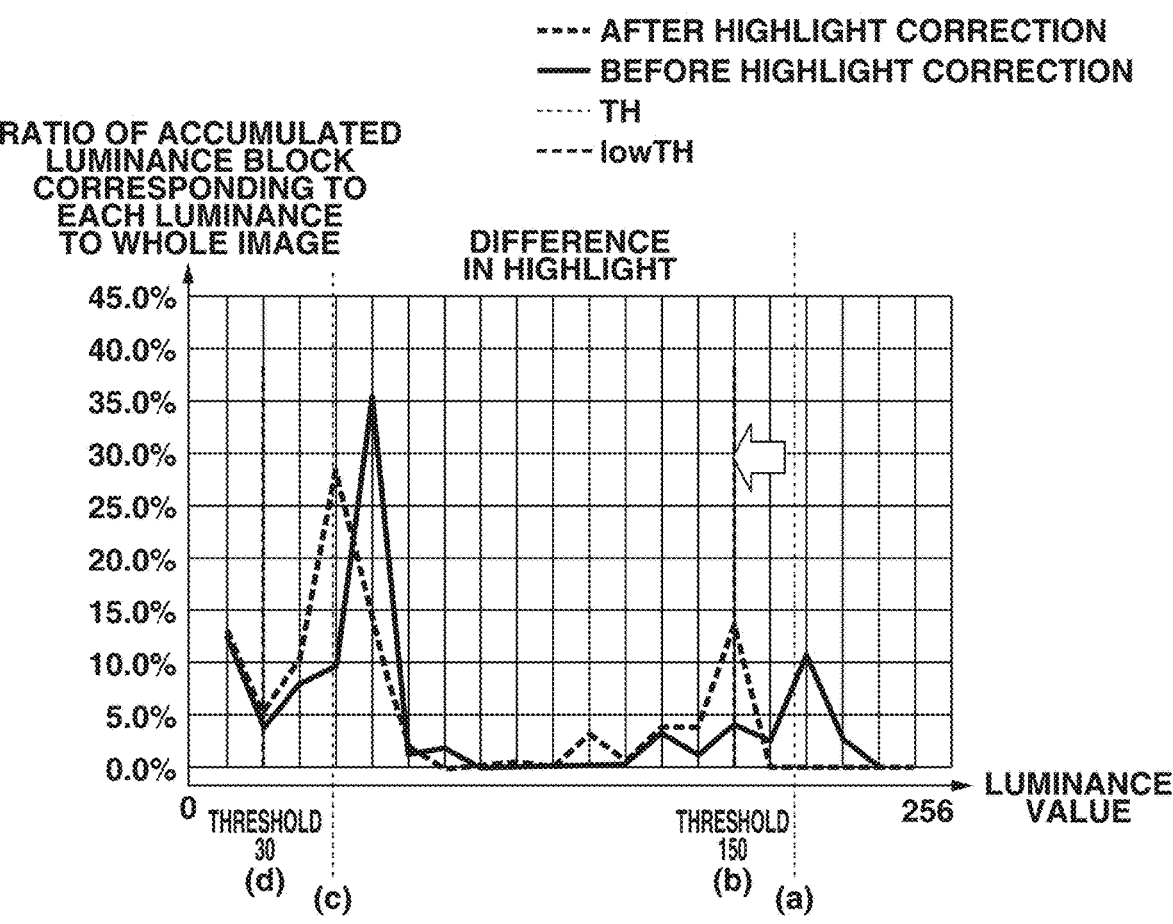
FIG. 8 is a histogram in the flow of the processing illustrated in FIG. 6.

In a case where the control unit 502 determines that the type is the highlight photometry (YES in step S605), the processing proceeds to step S607. In step S607, the control unit 502 sets an upper limit threshold (high luminance threshold) and a lower limit threshold (low luminance threshold) of the luminance histogram. This allows the user to preliminarily set a threshold among selectable thresholds, as illustrated in FIG. 4, and to use the thresholds differently depending on purposes. For example, for a user who wants to use the luminance gradation within the screen as effectively as possible, it becomes possible to select a threshold for high luminance as TH3, and thereby select a setting that takes into consideration of the loss of the dark portion while preventing overexposure. For a user who considers the high luminance region to be the main object, it becomes possible to make a setting to decrease a threshold to the exposure target luminance as TH1. Meanwhile, for a user who considers prioritizing the high luminance gradation and performing digital processing using a PC application or the like after imaging to make gradation correction on the dark portion and the bright portion, it becomes possible to make a setting with a margin on the high luminance gradation side as TH2. Regarding the lower limit threshold, the present disclosure is described on the assumption of turning ON/OFF a setting of a threshold of 30 as illustrated in FIG. 8, and the control unit 502 here puts a restriction on a correction amount of highlight correction. Thereafter, the processing proceeds to step S608.

In step S608, the second luminance calculation unit 515 accumulates a block integral value in the image for each luminance with an exposure control value at the present time to obtain the luminance histogram (FIG. 8). The second luminance calculation unit 515 acquires a luminance value that ranks in the top 3% of the histogram (luminance (a) in FIG. 8), and the processing proceeds to step S609 (acquires the high luminance accumulated value).

In step S609, the exposure correction value calculation unit 516 calculates a difference in luminance stops between the luminance (a) acquired by the second luminance calculation unit 515 in step S608 and the threshold luminance (b) of Y150.

$$HilightCmp = LOG2(a/b)$$

The exposure correction value calculation unit 516 adds the difference in luminance stops to the current photometric value (Bv1 in this case) to obtain correction stops, and thereby calculates a target photometric value Bv2.

$$Bv2 = Bv1 + HilightCmp$$

Thereafter, the processing proceeds to step S610, the exposure correction value calculation unit 516 uses the obtained Bv value (Bv2) to give a feedback to the block integrals, and recalculates a corrected histogram (dotted line) in FIG. 8, and the processing proceeds to step S611.

In step S611, the third luminance calculation unit 518 acquires a luminance value that ranks in the bottom 10% (luminance (c) in FIG. 8) in the corrected histogram and calculates a difference in luminance stops (UNDERClip) between the luminance (c) and the threshold luminance (d) of Y30, and the processing proceeds to step S612.

$$UNDERClip = LOG2(c/d)$$

In step S612, the exposure correction value calculation unit 516 determines whether this difference in luminance stops is less than a threshold servings as a lower limit (lower limit threshold). For example, assuming that the lower limit threshold is 0, in a case where the difference in luminance stops is 0 or more (NO in step S612), the processing proceeds to step S613. In a case where the difference in luminance stops is less than 0 (YES in step S612), the processing proceeds to step S614.

In step S613, the exposure correction value calculation unit 516 adds the highlight correction as it is, and the processing proceeds to step S606.

$$UNDERClip \geq 0, Bv = Bv + HilightCmp$$

On the other hand, in step S614, the exposure correction value calculation unit 516 decreases a correction amount by the following expression to perform processing of preventing the loss of the dark portion in low luminance, and thereafter the processing proceeds to step S606.

$$UNDERClip < 0, Bv = Bv + HilightCmp + UnderClip$$

In step S606, the control unit 502 feeds back the photometric value obtained in step S612 or S613 to AE control, whereby exposure control is executed.

In step S615, the control unit 502 determines whether it has received a notification about the first shutter switch signal SW1 from the shutter switch. In a case where the notification about the first shutter switch signal SW1 is not issued (NO in step S615), the above-mentioned processing from step S602 to step S606 is repeated. In contrast, when the notification about the first shutter switch signal SW1 is issued (YES om step S615), the processing proceeds to step S616. In step S616, the control unit 102 acquires a final photometric value.

The processing proceeds to step S617. In step S617, the control unit 502 determines whether it has received a notification about the second shutter switch signal SW2 from the shutter switch to determine whether to perform main imaging based on the final photometric value. In a case where the notification about the second shutter switch signal SW2 is issued (YES in step S617), the processing proceeds to step S618. In step S618, the main imaging is performed and the imaging ends. In a case where the notification about the second shutter switch signal SW2 is not issued (NO in step S617), the processing returns to step S615, in which the control unit 502 determines that it has received the notification about the first shutter switch signal SW1. In a case where the notification about the first shutter switch signal SW1 is not issued (NO in step S615), the processing returns to step S602. In a case where the notification about the first shutter switch signal SW1 is issued (YES in step S615), the processing proceeds to step S616. In step S616, the control unit 502 newly acquires a final photometric value, and prepares for the notification about the second shutter switch signal SW2.

As described above, the disclosure allows the user to control the high luminance region into gradation as intended by the user when the highlight photometry is selected. By setting a threshold also on the low luminance side, it becomes possible to make an appropriate exposure setting as the whole image without correcting a region other than the high luminance region to an underexposure state.

The above-mentioned exemplary embodiments can also be implemented by installation of a program that implements one or more functions of the above-mentioned exemplary embodiments in a system or an apparatus via a network or a storage medium, and loading and execution of the program by one or more processors in the system or a computer of the apparatus. Furthermore, the above-mentioned exemplary embodiments can also be implemented by a circuit (e.g., application-specific integrated circuit (ASIC)) that implements one or more functions.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-050400, filed Mar. 27, 2023, which is hereby incorporated by reference herein in its entirety.

What is claimed is:

1. An apparatus comprising:
a sensor configured to pick up images;
a setting device configured to set a photometry mode; and
at least one processor and a memory coupled to the at least one processor storing instructions that, when executed by the at least one processor, cause the at least one processor to function as:
a first calculation unit configured to calculate a first value from a whole of an image;
a second calculation unit configured to calculate a second value from, out of the whole of the image, a region whose value is equal to or higher than a predetermined threshold; and
a determination unit configured to determine a target value,
wherein the determination unit is configured to:
use the first value to determine the target value in a case where the photometry mode set by the setting device is a first mode; and
use the second value to determine the target value in a case where the photometry mode set by the setting device is a second mode that is different from the first mode, and
wherein the predetermined threshold is a value that is higher than the target value in the first mode.

2. The apparatus according to claim 1, wherein the second calculation unit is configured to calculate a luminance value in a predetermined ratio when accumulated from a high luminance side and calculate, as a correction value, a difference between the luminance value and exposure calculated using a value set as the predetermined threshold.

3. The apparatus according to claim 1, wherein the predetermined threshold equal to or higher than is the target value.

4. The apparatus according to claim 1, wherein the predetermined threshold is settable by a user.

5. An apparatus comprising:
a sensor configured to pick up images;
a setting device configured to set a photometry mode; and
at least one processor and a memory coupled to the at least one processor storing instructions that, when executed by the at least one processor, cause the at least one processor to function as:
a first calculation unit configured to calculate a first value from a whole of an image;
a second calculation unit configured to calculate a second value from, out of the whole of the image, a region whose value is equal to or higher than a first threshold; and
a third calculation unit configured to calculate a third value from, out of the whole of the image, a region whose value is a second threshold or less, the second threshold being different from the first threshold used by the second calculation unit; and a determination unit configured to determine a target value,
wherein the determination unit is configured to:
use the first value to determine the target value in a case where the photometry mode set by the setting device is a first mode; and
use the first value, the second value, and the third value to determine the target value in a case where the photometry mode set by the setting device is a second mode that is different from the first mode.

6. The apparatus according to claim 5, wherein the third calculation unit is configured to calculate a value in a predetermined ratio when accumulated from a low luminance side and restrict exposure correction using the second value so that the value is not lower than a predetermined lower luminance threshold.

7. The apparatus according to claim 5, wherein the first threshold and the second thresholds are settable by a user.

8. A method comprising:
picking up images;
setting a photometry mode;
calculating a first value from a whole of an image;
calculating a second value from, out of the whole of the image, a region whose value is a predetermined threshold or more;
determining a target value;
using the first value to determine the target value in a case where the photometry mode set by the setting device is a first; and
using the second value to determine the target value in a case where the photometry mode set by the setting device is a second mode that is different from the first mode,
wherein the predetermined threshold is a value that is higher than the target value in the first mode.

9. The method according to claim 8, wherein the predetermined threshold is a value that is higher than the target value in the first mode.

10. The method according to claim 8, wherein the calculating the second value includes calculating a luminance value in a predetermined ratio when accumulated from a high luminance side and calculating, as a correction value, a difference between the luminance value and exposure calculated using a value set as the predetermined threshold.

11. A method comprising:
picking up images;
setting a photometry mode;
calculating a first value from a whole of an image;
calculating a second value from, out of the whole of the image, a region whose value is equal to or higher than a first threshold;
calculating a third value from, out of the whole of the image, a region whose value equal to or lower than is a second threshold, the second threshold being different from the first threshold;
determining a target value;
using the first value to determine the target value in a case where the photometry mode is a first mode; and
using the first value, the second value, and the third value to determine the target value in a case where the photometry mode is a second mode that is different from the first mode.

12. The method according to claim 11, wherein the calculating the third value includes calculating a value in a predetermined ratio when accumulated from a low luminance side and restricting exposure correction using the second value so that the value is not lower than a predetermined lower luminance threshold.

13. The method according to claim 11, wherein the first threshold and the second thresholds are settable by a user.

14. A non-transitory computer-readable storage medium storing a program for causing a computer to execute a method, the method comprising:

picking up images;

setting a photometry mode;

calculating a first value from a whole of an image;

calculating a second value from, out of the whole of the image, a region whose value is a predetermined threshold or more;

determining a target value;

using the first value to determine the target value in a case where the photometry mode set by the setting device is a first mode is set; and using the second value to determine the target value in a case where the photometry mode set by the setting device is a second mode that is different from the first mode, wherein the predetermined threshold is a value that is higher than the target value in the first mode.

15. The non-transitory computer-readable storage medium according to claim 14, wherein the calculating the second value includes calculating a luminance value in a predetermined ratio when accumulated from a high luminance side and calculating, as a correction value, a difference between the luminance value and exposure calculated using a value set as the predetermined threshold.

16. A non-transitory computer-readable storage medium storing a program for causing a computer to execute a method, the method comprising:

picking up images;

setting a photometry mode;

calculating a first value from a whole of an image;

calculating a second value from, out of the whole of the image, a region whose value is equal to or higher than a first threshold;

calculating a third value from, out of the region, a region whose value is equal to or lower than a second threshold;

determining a target value;

using the first value to determine the target value in a case where the photometry mode is a first mode; and using the first value, the second value, and the third value to determine the target value in a case where the photometry mode is a second mode that is different from the first mode.

17. The non-transitory computer-readable storage medium according to claim 16, wherein the calculating the third value includes calculating a value in a predetermined ratio when accumulated from a low luminance side and restricting exposure correction using the second value so that the value is not lower than a predetermined lower luminance threshold.

18. The non-transitory computer-readable storage medium according to claim 16, wherein the first threshold and the second thresholds are settable by a user.

\* \* \* \* \*